United States Patent
Chien et al.

[19]

[11] Patent Number: 6,115,325
[45] Date of Patent: Sep. 5, 2000

[54] VARIABLE LENGTH DATA FIELD IN A SEISMIC DATA STREAM

[75] Inventors: Loring C. Chien, Katy; Richard August Falzone, Houston, both of Tex.

[73] Assignee: Syntron, Inc., Houston, Tex.

[21] Appl. No.: 09/062,905

[22] Filed: Apr. 20, 1998

[51] Int. Cl.$^7$ .................................................... G01V 1/38
[52] U.S. Cl. ............................ 367/21; 367/15; 364/421
[58] Field of Search ............................... 367/79, 21, 15, 367/60; 340/15.5, 185; 364/421

[56] References Cited

U.S. PATENT DOCUMENTS

| | | | |
|---|---|---|---|
| 3,996,553 | 12/1976 | Siems et al. | 340/185 |
| 4,023,140 | 5/1977 | Siems et al. | 340/15.5 |
| 4,072,923 | 2/1978 | Siems et al. | 340/15.5 |
| 4,092,629 | 5/1978 | Siems et al. | 340/15.5 |
| 4,117,448 | 9/1978 | Siems | 340/15.5 |
| 4,635,237 | 1/1987 | Benestad et al. | 367/20 |
| 4,709,355 | 11/1987 | Woods et al. | 367/16 |
| 4,967,400 | 10/1990 | Woods | 367/21 |
| 5,058,080 | 10/1991 | Siems et al. | 367/79 |
| 5,450,369 | 9/1995 | Mastin et al. | 367/21 |
| 5,631,874 | 5/1997 | Mastin et al. | 367/15 |

*Primary Examiner*—Christine Oda
*Assistant Examiner*—Anthony Jolly
*Attorney, Agent, or Firm*—Gunn & Associates, P.C.

[57] ABSTRACT

A variable length data packet in a seismic system includes a fixed-length data portion and a variable-length data portion, the amount of data in the variable-length portion depending on the number of active channels. The data packet identifies the number channels which are in operation in the system, which may be the same or fewer than the number of installed channels. This signals the central recorder as to the length of the block of data in the data packet which includes seismic data. This feature permits the scaling of the system to accommodate varying numbers of channels, without reconfiguring the system. In another aspect, a method of sending data in a data system having a plurality of installed channels includes the steps of determining the number of active channels; assembling a packet of data comprising a fixed-length field and a variable-length field, the number of data bytes in the variable-length field being a function of the number of active channels; and sending the packet of data.

19 Claims, 3 Drawing Sheets

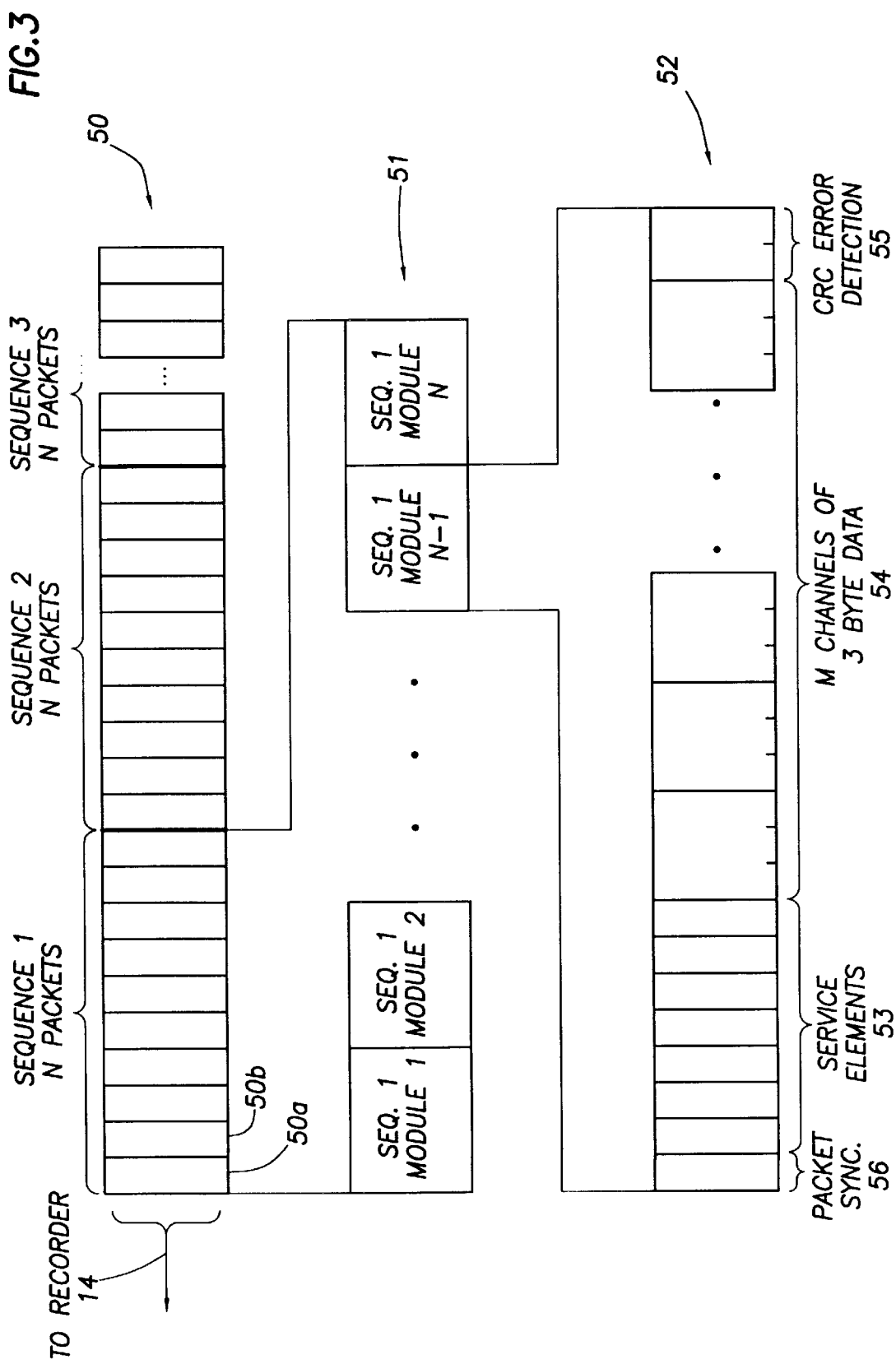

VARIABLE LENGTH DATA FIELD IN A SEISMIC DATA STREAM

FIELD OF THE INVENTION

The present invention relates generally to the field of data transmission and reception and, more particularly, to a method and structure for the collection and transmission of seismic data including a variable length field for imaging data.

BACKGROUND OF THE INVENTION

Seismic techniques are used today to explore the oceans of the earth for deposits of oil, gas, and other minerals. In such exploration, an exploration vessel imparts an acoustic wave into the water, typically by use of a compressed air gun. The acoustic wave travels downwardly into the sea bed and is reflected at the interfaces between layers of materials having varying acoustic impedances. The wave travels back to a streamer towed behind the vessel where it is detected by hydrophone sensors in the streamer to yield data regarding characteristics of the subsurface geologic structures. Land seismic systems use geophones on land in a similar manner. Ocean bottom and transition zone systems use both hydrophones and geophones.

The towed streamer includes a large number of pressure-sensitive hydrophone sensors enclosed within a waterproof jacket and electrically coupled to recording equipment onboard the vessel. Each hydrophone sensor within the streamer is designed to convert pressure variations surrounding the hydrophone sensor into electrical signals. Due to its extreme length, which may be thousands of meters, the streamer is often divided into a number of separate sections that can be decoupled from one another and that are individually waterproof. Individual streamers can be towed in parallel through the use of paravanes to create a two dimensional array of hydrophone sensors. Data busses, running through each of the sections of the streamer, carry the signals in the form of acoustic data from the hydrophone sensors to the recording equipment.

In addition to acoustic data, the streamer collects and transmits data concerning operational status of the array to the vessel. This data is referred to as non-acoustic data. This data comprises physical characteristics of interest regarding the operation of each section, including whether water has invaded a field acquisition unit (AU) or module in the streamer, temperature, depth, and power supply voltage for components in the streamer.

Many towed arrays have digital data channels. With digital data transmission, data transmission rates are higher and, with proper attention to electromagnetic interference, data fidelity is maintained from the hydrophones to the recording equipment.

Typically, AUs are designed with fixed numbers of acquisition channels and a number of additional information channels for AU status. A channel is used to acquire the acoustic data from a group of hydrophones or geophones at or near one physical point in the streamer or cable space. For example, Syntron's streamer module or AU has 12 channels. Each system typically transmits down a single link that connects a recorder and a number of AUs and the recorder and an AU may be thousands of meters apart. The number of AUs may be one hundred or so and the distance separating them may be on the order of hundreds of meters.

In each system, two of the limiting factors in maximum telemetry length and channel count are the distance between AUs (to repeat data) and the number of AUs whose data will fill the time slots (at fixed transmission rates). The data packet from each unit typically has a fixed length in terms of number of bits and therefore takes a fixed time to send at the maximum transmission rate (measured in bits per second). Since the data must be transmitted in real time and a certain sampling interval (typically 1, 2, or 4 ms) is specified, the number of AUs is limited, limiting maximum telemetry length and channel count.

The number of channels per AU differs in land, marine, ocean bottom, and transition zone applications for many reasons, ranging from a high of sixteen to a low of one channel in known systems. The reasons for the variation in the number of channels per AU include the length of sensor intervals, complexity, AU size, weight, and power, cable complexity, length, and weight, and deployment site variables such as ravines, streams and water zones, and accessibility. It is expected that some future systems will continue to include more and more channels per AU and that some will have small numbers of channels where conditions warrant.

In most present systems, all AUs in the system have the same fixed number of channels. In one exception, one known system can be configured with one, three, or six channels per AU, but in that system, transmission length is fixed with a specific hardware configuration and all units must have the same channel configuration.

The present invention is part of a variable channel AU which may include from 4 to 256 physical channels, the number of channels being transmitted a function of both physical capacity of the specific AU and remote programming of the AU. It is intended to activate only up to the number of channels used, which may be fewer than the number actually installed. Remote programming is accomplished by means of sending commands to the AU over a command data bus originating in the seismic system central recorder.

Other systems could turn off data transmission from AUs just acting as repeaters so that there would be more telemetry time for units more remote from the towing vessel. Such systems, however, suffer in that there is no information emanating from those repeater AUs, thus making telemetry problems difficult to troubleshoot. It is desirable to know the internal conditions (like temperature, pressure, operating voltages and currents, clock errors, etc.) of units merely acting as data repeaters because errors in them can adversely affect the data.

In Syntron's present system, the Syntrak, a 12-channel AU, data reduction to six channels (by means of summing or array forming channels) still results in a full data packet (enough to handle all 12 channels) rather than reducing the packet size.

Because early seismic systems usually were composed of acquisition units that were the same, early seismic systems handled only fixed length seismic packets. In fact the earliest ones only had one channel per unit anyway. Circuits that handled seismic unit data were kept simple in having to deal with fixed format packets, each system having unique packet formats.

Thus, there remains a need for a seismic system which may be adapted to include a variable number of channels per acquisition unit and which therefore includes a variable length of acoustic data packet to accommodate the variation in the number of channels.

The seismic system central recorder must have corresponding ability to decode incoming data packets, determine the number of active channels for each AU, and recover the channels' data from the packet.

By having a telemetry protocol in which the number of included channels is defined, such a system provides the following advantages:

(1) All devices using the protocol may talk to a common data receiver unit in the central seismic recorder that is an integral part of all seismic acquisition systems, without having to change the design of the receiver.

(2) The system provides more efficient use of bandwidth. A large number of small-channel-count AUs may be used, a smaller number of large-channel-count AUs may be used, or a mixture of large-channel-count and small-channel-count AUs may be intermixed on a telemetry line.

(3) Rapid engineering of new AUs of specific maximum channel-counts for specific application to land, jungle, transition zone, marine streamers, single-component ocean bottom, dual-component ocean bottom, or four-component ocean bottom uses, in various combinations of group interval lengths is possible.

(4) Such a system provides the ability to retrieve continuous state-of-health status from units programmed for zero channels (data repeaters).

(5) Tailoring of AUs to meet customer cost goals by adding or deleting acquisition channels, the most costly components, from AU chassis, to meet specific channel requirements, is provided.

SUMMARY OF THE INVENTION

The present invention addresses these and other drawbacks of the prior art by providing a variable length data packet in a seismic system. The seismic data transmission packets in the system of this invention include a fixed portion and a variable portion, the variable portion consisting of individual elements or channels. The data packet identifies the number of channels which are in operation in the system, which may be the same or fewer than the number of installed channels. This tells the seismic system central recorder the length of the block of data in the data packet which includes seismic data. This permits the scaling of the system to accommodate varying numbers of channels, without physically reconfiguring the system.

Including information regarding the number of active channels also permits the remote programming of the size of the variable portion of the seismic data packet, or the number of elements of the packet. Thus, the size of the data packet (i.e., the number of elements) is transmitted as a data element in the data stream itself, thereby eliminating the need for a remote detection of the number of elements. This also provides the system with the ability to mix data packets of different lengths.

Thus, the variable length data packet of this invention provides a data transmission format which can transmit anywhere from 0 to 255 (or more) channels in an information packet. This system is able to mix acquisition units of differing number of channels on a single telemetry line to adapt to changing site conditions as the line covers long distances (e.g., tens of kilometers).

This system also maximizes the number of AUs allowed on the line since each will take no more than the time necessary to transmit the actual number of channels used rather than the total number of channels per unit. In so doing, this system maximizes the distance that can be covered since units programmed for zero channels act only as repeaters, and units with few channels will take relatively little of the time available for data transmission. Only units transmitting near the maximum number of channels take the large amount of time.

Repeater units are able to telemeter state-of-health information (that is, internal conditions such as serial number, type of unit, internal temperature, voltage, number and types of telemetry errors, etc.) that are critical to troubleshooting, even though no active channels are being acquired from the unit. Troubleshooting may be required since these units are in the data path and are required to pass commands and data.

Further, slowly changing internal state-of-health information is submultiplexed over a greater number of seismic samples so that overhead for this type of data is very low. In the system of this invention, the state-of-health information consists of one byte per packet, although this can be reduced to only one bit if desired. This allows several hundred bytes of information to be transmitted over a period of less than one second, perfectly satisfactory for such slowly changing data. Finally, with this system, one may localize data transmission errors to specific data words so that error indications can be pinned on a specific data item rather than the whole block The error information and state-of-health information are embedded in the "service elements" portion of the data packet described below.

These and other features of the present invention will be apparent to those of skill in the art from a review of the following detailed description along with the accompanying drawings.

BRIEF DESCRIPTION OF THE DRAWINGS

FIG. 3 is a schematic diagram of a data structure of the present invention.

DETAILED DESCRIPTION OF A PREFERRED EMBODIMENT

Figure 1:
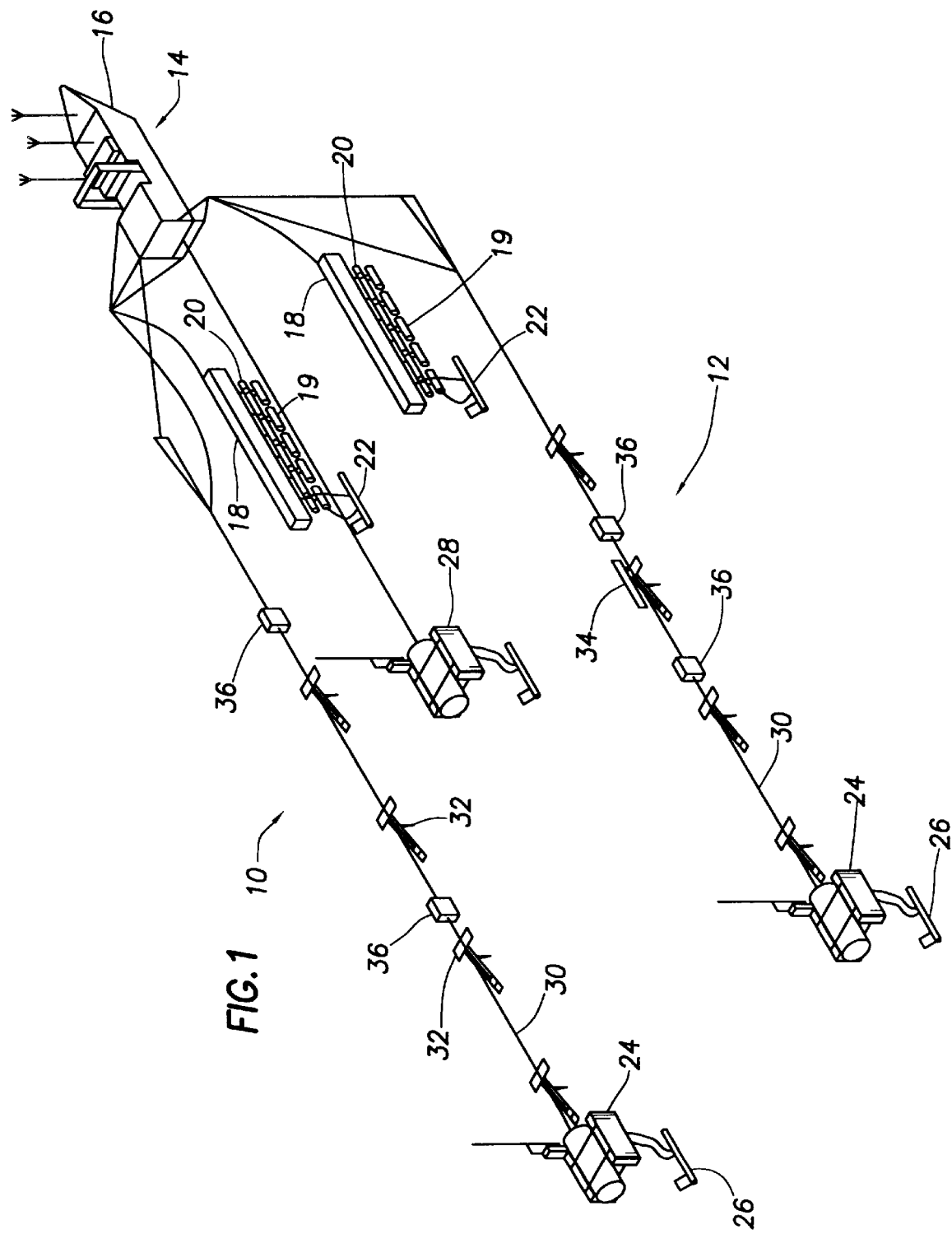
FIG. 1 is a schematic diagram of a marine seismic system.

The system depicted in FIG. 1 is a data acquisition and control system 10 designed for marine seismic operations. The present invention is described below with regard to a marine seismic system, but it is equally applicable to any seismic system, including ocean bottom and land systems.

In the system shown in FIG. 1, modular design provides the user with an integrated control and position system that can be customized to meet the particular needs of each survey. The system comprises a shipboard controller or central recorder 14 aboard a vessel 16 and in-water remote units 12 of various types and functions.

The in-water remote units 12 include air gun arrays 18, which may be of many well known types. Accompanying each gun array 18 is a set of guns 19, gun acoustic units 20, and associated tow fish acoustic units 22 deployed beneath. The system also includes a tail buoy 24 and an associated tow fish acoustic unit 26 at the end of each streamer 30, for example.

The system may also include a tow buoy 28 and either a gun acoustics unit or a surface mount unit. The gun acoustics unit provides precise location of the seismic energy source (i.e., the gun) relative to a fixed reference point, while the surface mount acoustic unit is used in locations where the use of streamer-mounted remote units would be impractical. Spaced along each streamer is a plurality of depth control devices 32, any of which may also include a float tube 34 attached to it.

Guns 19 in array 18 have firing circuits, firing sensors, and near-field pressure sensors for use in precisely synchronizing acoustic energy release.

As used herein, each of the devices along the streamers which require communication with the boat through the streamer are referred to collectively as external devices. Communication to and from the external devices, as well as communication of seismic data, is all carried on through each streamer 30. Further, the streamer of this invention is scalable to include multiple channel configurations. In other words, this invention provides a method and a structure for the addition of multiple channels of acoustic data by the simple expedient of reprogramming the controller aboard the vessel 16.

Figure 2:
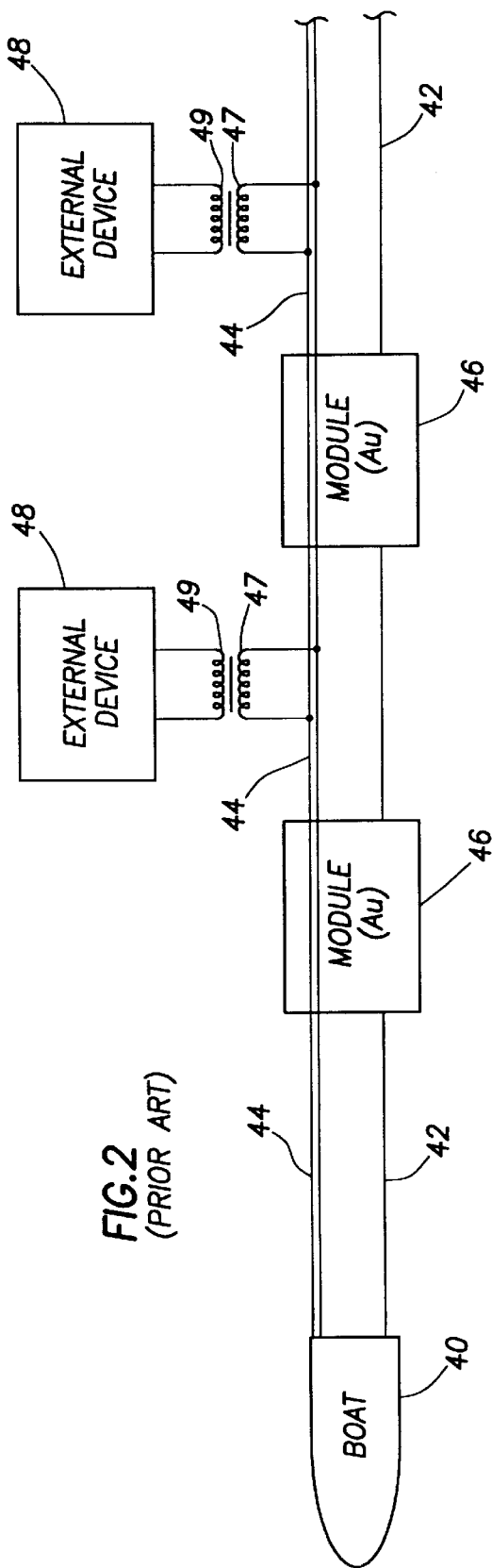
FIG. 2 is a schematic block diagram of a seismic streamer.

FIG. 2 depicts further details of a seismic streamer communication system wherein the present invention finds application. The vessel or boat 16 controls both the seismic data acquisition streamer electronics and the external devices. Each of the external devices terminates independently into one or more systems for communication with the boat 16. Seismic data telemetry bus 42 has no signal connections to the external device system twisted pair signal bus 44. AUs 46 are located at intervals along the cable for seismic acquisition surveys. As previously described, the seismic data telemetry bus 42 may include multiple channels of seismic data. In this invention, the seismic data telemetry bus is preferably fiber optic, and thus the number of channels which may be accommodated is greatly enhanced, and the telemetry rate is preferably 65.536 MHz. The use of fiber optics in the seismic data telemetry bus also reduces the need for passive AUs to repeat data by increasing the distance between repeaters. The seismic data telemetry bus 42 may also be a wireless telemetry means which telemeters data to a central receiver 14.

The inbound data path along the seismic data telemetry bus 42 from the AUs ending in the streamer interface in the recorder aboard the vessel 16 is referred to herein as the data side. As shown in FIG. 3, a series of data packets 50a, 50b, etc. are carried along the bus 42 to the recorder. Each data packet comprises a number of bits of various functions, as shown in FIG. 3 and described below with regard to TABLE 1. It should also be noted that an acquisition unit may temporarily store a number of samples of data from each channel that may be included in one packet of data.

Data packets are sent by each AU in response to real-time extract commands. The data packets have a variable length, dependent upon the assigned number of active channels for that AU. The packet preferably has the following structure:

TABLE 1

| Item | Function | Length-bits (format) |
|---|---|---|
| 1 | Packet Sync | 8 |
| 2 | Service Elements | 9 (8 + PO) (each) |
| 3 | Variable length Seismic Data block | N × 25 (N × [24 + PO]) |
| 4 | CRC-16 on item 2 | 16 |

PO = odd parity; N = number of channels

In the packet structure shown in TABLE 1, synchronization bits are analogous to start bits; that is, 8 bits with specific, recognizable code indicates AU 1 (i.e., the start of a packet of data). Preferably, the start of the data packet of the AU closest to the vessel 16 (AU 1) further includes a signal the start of this data packet.

Item 2, the service elements, include a variety of data elements which may be arranged in any order, including AU address; sequence number; the number of channels in this packet; AU status; status flags; general communications information; and may include a spare byte for flexibility in tailoring the system to a specific customer's needs.

For the AU address, AUs are preferably numbered sequentially starting with AU 1 closest to the vessel. The sequence number designates which in a sequence of data acquisition sequences or packets is being received by the recorder. It increments for each sample acquired. The value is zero (representing time $T_0$) when the first valid sample is acquired. It increments for each sample afterwards as a modulo 256 counter (i.e., rolls over to zero following 255), for example, depending on maximum number of channels designed in the system.

A status byte comprises eight bits for items which need to be flagged more often than the period of a complete AU status sequence. Among them are:

(1) a bit to indicate first sample after time break;
(2) a bit to indicate beginning of AU status data sequence, i.e. byte 1 of the auxiliary function sequence;
(3) a bit to indicate presence of valid terminal session byte in the general communications byte; and
(4) a bit to indicate presence of valid auxiliary command byte (asynchronously received from birds or other external device) in the general communications byte. This bit is valid for one packet.

The data structure may also include one byte of AU status data. The complete AU status data is composed of hundreds of bytes, thus the data bytes are sent in sequence (one per packet from that module) and there is a bit in the status byte which indicates which is the first byte is being sent.

The data structure may further include general communications inbound data. This data can be one of the following:

(1) data received asynchronously from the birds by a universal asynchronous receiver/transmitter (UART) in the AU when the AU external device communications is in an enhanced mode. In the enhanced mode, a switch in an AU 46 is opened so that the bus 44 is segmented between AUs. This feature is disclosed in copending application Ser. No. 09/044,740 filed Mar. 19, 1998 and incorporated herein by reference. This bit in the status byte (external device communications bit) indicates that a byte has been received and been transferred to this data packet; or (2) terminal session console data from internal processor. A valid byte is indicated by a bit of the status byte being set. At 1 ms sample interval, the terminal data rate of 1000 bytes/sec can exceed that of a 9600 baud serial line (960 bytes/sec). At 2 ms, the data rate is 500 bytes/sec.

Item 3 is the variable length seismic data block. This block includes N×3 bytes of seismic data (3 bytes per channel) or configuration data upload, depending upon operational mode, plus parity for each 24-bit word. As previously described, the data block may include more than one sample for each channel that has been temporarily stored in an acquisition unit.

This structure is depicted diagrammatically in FIG. 3. A data stream 50 comprises a series of sequences 51 of closely spaced packets 52. Each sequence comprises N packets of data. This corresponds to N modules (AUs), as previously described. A packet 52 comprises a data set which includes the packet sync byte 56 and the service elements 53; a variable length data set 54 comprising M channels of 3-byte data; and an error detection word 55. Thus, as more channels are added to meet customer needs, in order to accommodate the data, the recorder and on-board computer need only be made to detect the byte which determines the number of the AU and the number of channels in order to properly decode the seismic data, rather than a wholesale re-engineering of the system.

As depicted in FIG. 3, the data stream is transmitted to the central recorder 14. At the central recorder 14, the number of channels in each incoming data packet is determined and the acquisition unit and channel information is recovered.

The communications channels or busses 42 and 44 shown in FIG. 2 are bi-directional. In other words, in addition to carrying the data structure from various streamer components to the central recorder, the communications channels also carry commands from the central recorder to the streamer components. Thus, in the present invention, each acquisition unit is individually and remotely programmable as to the number of active channels, which may be the same or fewer than the number of installed channels. In this way, an acquisition unit may be deactivated from the point of view of acquiring seismic data but will serve then as a repeater in the streamer. Further, the data structure of this invention includes an element of information regarding individual channels and thus operates as a seismic source control system wherein channels represent individual source elements.

ALTERNATIVE FORMS OF THE INVENTION

The invention described uses optical transmission of commands and data. Embodiments can also be made with electrical wires, radio signals, through-free-space optical communications, or other forms of telemetry transmission, and fall within the scope and spirit of this invention. Further, The invention as described above uses "down-the-cable" power transmission but any appropriate power source, such as local battery power, solar panels, or other source of local power, may be used.

The order of information described above is not required, nor are many of the data bytes. The main requirement for the embodiment of this invention is a data packet containing pieces of information which can be construed as "number of elements" and the elements themselves, where the elements make up the main content of the data packet. The number of elements may also be remotely programmable.

The invention described is applied to a seismic data acquisition system. Another seismic use is for a source control system in which parameters/signals such as near-field, pressure, fire detect sensor, and solenoid current are acquired from a variable number of guns. Furthermore, the invention may be applied to any telemetry system in which it may be desirable to send variable amounts of serial data in packets and the system would benefit from minimizing packet size.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A method of sending data in a data system having a plurality of installed channels, the method comprising the steps of:

a. determining the number of active channels out of the number of installed channels;

b. assembling a packet of data comprising a fixed-length field and a variable-length field, the number of data bytes in the variable-length field being a function of the number of active channels; and c. sending the packet of data.

2. The method of claim 1, further comprising the steps of:

a. storing a plurality of samples from at least one of the active channels; and b. including the plurality of samples in the variable-length field during the step of assembling a packet of data.

3. The method of claim 1, wherein the data system comprises a seismic data transmission system.

4. The method of claim 1, wherein the data system comprises a towed marine seismic data transmission system.

5. The method of claim 1, wherein the number of active channels out of the number of installed channels is included as an item of data in the fixed-length field of the data packet.

6. A system for sending data in a data system having a plurality of installed channels, the system comprising:

a. means for determining the number of active channels out of the installed channels;

b. means for assembling a packet of data comprising a fixed-length field and a variable-length field, the number of data bytes in the variable-length field being a function of the number of active channels; and c. means for sending the packet of data.

7. The system of claim 6, further comprising means for storing a plurality of samples from at least one of the active channels, the plurality of samples to be included as data in the variable-length field.

8. A data system comprising:

a. a plurality of data acquisition units, each of the acquisition units having a plurality of channels;

b. digital telemetry means interconnecting acquisition units to telemeter data from each acquisition unit to a central recorder;

c. means for determining the number of active channels in each acquisition unit;

d. means for each channel to acquire digital data samples from a sensor connected to once of said plurality of channels; and e. means for generating one or more data packets emanating from each acquisition unit for each sample, wherein each of said one or more data packets comprises a fixed portion and a variable portion, the variable portion carrying channel data and the amount of data in the variable portion being a function of the determined number of active channels in each acquisition unit.

9. The system of claim 8 wherein the number of active channels is an item of information embedded in the data packet.

10. The system of claim 8 wherein the acquisition units are individually programmable as to number of active channels.

11. The system of claim 10 wherein the acquisition units are remotely programmable as to the number of active channels.

12. The system of claim 8 wherein the data system comprises a seismic data system.

13. The system of claim 8 wherein the data system comprises a towed marine seismic data transmission system.

14. The system of claim 8 wherein the data system comprises a seismic source control system and the channels represent individual source elements.

15. The system of claim 8 further comprising a centrally located receiver which determines the number of active channels in each incoming data packet and recovers the acquisition unit and channel information.

16. The system of claim 8 wherein the number of active channels is embedded in the data packet and is used to recover the data in the data packet.

17. The system of claim 8, wherein the means for generating a data packet comprises multiple samples from each channel per packet.

18. The system of claim 11, wherein an acquisition unit with no active acquisition channels comprises a data repeater.

19. The system of claim 8 wherein the digital telemetry means is wireless and telemeters data to a central receiver.

* * * * *